United States Patent Office 3,244,732
Patented Apr. 5, 1966

3,244,732
1,2,5,6-DIEPOXYCYCLOOCTANE
Frederick C. Frostick, Jr., and Benjamin Phillips, Charleston, W. Va., assignors to Union Carbide Corporation, a corporation of New York
No Drawing. Original application Oct. 12, 1961, Ser. No. 144,575, now Patent No. 3,065,209, dated Nov. 20, 1962. Divided and this application July 12, 1962, Ser. No. 217,229
1 Claim. (Cl. 260—348)

This application is a division of our copending application, Serial No. 144,575, filed October 12, 1961, now Patent No. 3,065,209.

This invention relates to 1,2,5,6-diepoxycyclooctane, and to compositions and resinous products obtained therefrom. The diepoxide of this invention is of particular interest in the plastics and resins industry and is particularly adapted for use in the preparation of resinous products by reaction with difunctional organic chemical compounds such as diamines, dialdehydes, dicarboxylic acids, diols and the like. The resinous products thus produced can then be formed into useful articles or employed in electrical applications as potting compositions. Furthermore, the diepoxides of this invention will react with adipic acid to form flexible, thermoplastic resins. Consequently, this diepoxide, in admixture with adipic acid, provides compositions which are particularly desirable for use in coating applications wherein flexible, thermoplastic surface coatings are desired. In addition, 1,2,5,6-diepoxycyclooctane is also useful as a stabilizer for vinyl chloride resins.

The 1,2,5,6-diepoxycyclooctane of this invention can be represented graphically by the following general formula:

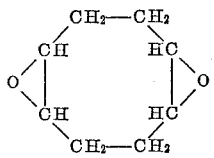

The preparation of the diepoxide is carried out by reacting 1,5-cyclooctadiene and at least 2 moles of peracetic acid, per mole of 1,5-cyclooctadiene. The reaction of 1,5-cyclooctadiene and peracetic acid is preferably carried out by the addition of an excess amount of peracetic acid to the 1,5-cyclooctadiene at temperatures in the range of from —25° C. to about 150° C. and preferably in the range of from 0° C. to 45° C. The reaction is exothermic and external cooling can be applied, if desired, to maintain the desired temperature and to assure a reasonable reaction rate. The reaction is allowed to proceed until an analysis of a sample of the reaction mixture indicates that the theoretical amount of peracetic acid has been consumed. The product is recovered from the reaction mixture by separation of the unreacted peracetic acid under any suitable conditions which will not destroy the epoxide groups. Preferred methods for recovering 1,2,5,6-diepoxycyclooctane from the reaction mixture include extraction, continuous distillation and distillation under reduced pressures.

In formulating compositions of 1,2,5,6-diepoxycyclooctane with adipic acid sufficient acid is admixed with the 1,2,5,6-diepoxycyclooctane so as to provide a composition containing from about 0.5 to about 1.2 carboxyl groups per epoxy group. Heating the compositions, so formulated, at elevated temperatures, generally on the order of about 120° C. to about 160° C. for a period of time of about 5 to about 15 hours will result in the production of a resinous product which is flexible and thermoplastic. The exact heating cycle will depend, of course, on the particular composition being heated. The following examples illustrate the present invention and are not intended to limit the scope thereof in any manner.

EXAMPLE 1

*Preparation of 1,2,5,6-diepoxycyclooctane*

1,5-cyclooctadiene (25 grams, 0.231 mole) was placed in a flask fitted with a stirrer and external cooling, and 188 grams of a 23.4% solution of peracetic acid in ethyl acetate (44 grams, 0.578 mole of peracetic acid) was added dropwise over a period of twenty-five minutes. During the addition and for two hours thereafter, the reaction solution was maintained at a temperature of 35° C. At the end of this period, an analysis for peracetic acid indicated that 97.8% of the theoretical amount of peracetic acid had been consumed.

The reaction solution was then added dropwise to a still kettle containing ethylbenzene fluxing at 25 mm. pressure. During the addition, there was distilled at the head enough material so that a head tempertaure of 30° C. to 32° C. was maintained. After addition, a low-boiling material was distilled up to the boiling point of pure ethylbenzene. There remained 72 grams of residue product which analyzed 0.14% as acetic acid. The residue product was fractionated through a ten-inch column packed with glass helixes, and there was obtained 27 grams of 1,2,5,6-diepoxycyclooctane which represented an 84.0% yield. The product, 1,2,5,6-diepoxycyclooctane was characterized and had the following physical properties:

Boiling Point=92° C.—93° C. (4 mm. Hg)
Refractive Index, $n_D^{30}$=1.4935
Analysis—Calculated for $C_8H_{12}O_2$:

|  | Theoretical | Found |
|---|---|---|
| C, percent | 68.54 | 68.40 |
| H, percent | 8.63 | 8.77 |

EXAMPLE 2

This example illustrates the new and totally unexpected properties possessed by the diepoxide of this invention.

Two compositions were prepared, Composition A which was based on 1,2,5,6-diepoxycyclooctane; and Control 1, which was based on 1,2,4,5-diepoxycyclohexane. Formulation of each composition, the heating cycle to which each composition was subjected and the properties of each composition are noted below.

|  | Control 1, gram | Composition A, gram |
|---|---|---|
| 1,2,4,5-diepoxycyclohexane | 0.6 |  |
| 1,2,5,6-diepoxycyclooctane |  | 0.7 |
| Adipic acid | 0.37 | 0.37 |
| Carboxyl group per epoxy group | 0.6 to 1 | 0.6 to 1 |

Each composition was subjected to the following heating cycle: seven hours at a temperature of 120° C., and then six hours at a temperature of 160° C.

At the end of the heating cycle, the product obtained from Control 1 was yellow in color and was a tough, infusible thermoset resin which had a Barcol Hardness of 57, determined using a Barcol Impressor GYZJ 934–1.

At the end of the same heating cycle, the product obtained from Composition A was a soft, flexible, thermoplastic resin which melted, when heated to a temperature of 160° C.

What is claimed is:

The diepoxide, 1,2,5,6-diepoxycyclooctane of the formula:

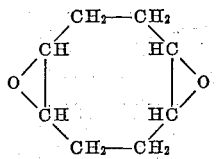

References Cited by the Examiner

UNITED STATES PATENTS

| | | | |
|---|---|---|---|
| 2,571,208 | 10/1951 | Craig | 260—348.5 |
| 2,739,161 | 3/1956 | Carlson | 260—348 |
| 2,745,847 | 5/1956 | Phillips et al. | 260—348 |
| 2,750,395 | 6/1956 | Phillips et al. | 260—348 |
| 2,786,067 | 3/1957 | Fristick et al. | 260—348 |

FOREIGN PATENTS 520,163  4/1940  Great Britain.

OTHER REFERENCES

Bedos, Comptes Rendus., vol. 195 pp. 802–804 (1932).

Carroll, Plastics Technology, vol. 7, 1961, pp. 52–54.

Fieser & Fieser, "Organic Chemistry" (3rd ed.), 1956, pp. 46 and 47.

Foster et al.: J.A.C.S., vol. 70, No. 7, pp. 2303–5 (1948).

Richter (I), "The Chemistry of the Carbon Compounds (Alicyclic)," vol. 2, page 1 (3rd ed.), 1939.

Richter, "The Chemistry of the Carbon Compounds," vol. 4, pp. 4 and 5 (1947).

Lee et al.: "Epoxy Resins," McGraw-Hill Book Co. (1957) (pages 52, 57, 162, 218–19 and 225 relied on).

WALTER A. MODANCE, *Primary Examiner.*

IRVING MARCUS, *Examiner.*

UNITED STATES PATENT OFFICE
CERTIFICATE OF CORRECTION

Patent No. 3,244,732       Dated April 5, 1966

Inventor(s) F. C. Frostick, Jr. et al

It is certified that error appears in the above-identified patent and that said Letters Patent are hereby corrected as shown below:

In Column 1, Line 13, after "Patent No. 3,065,209" insert --which in turn is a continuation-in-part of copending application serial number 527,424, filed August 9, 1955, now abandoned.--

Signed and sealed this 8th day of October 1974.

(SEAL)
Attest:

McCOY M. GIBSON JR.
Attesting Officer

C. MARSHALL DANN
Commissioner of Patents